United States Patent
Sylva et al.

(10) Patent No.: US 8,079,276 B2
(45) Date of Patent: Dec. 20, 2011

(54) DYNAMIC CALIBRATION ASSEMBLY FOR A FRICTION STIR WELDING MACHINE

(75) Inventors: Gilbert D. Sylva, Wichita, KS (US); Casey D. Allen, Andover, KS (US); Danny R. High, Wichita, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 690 days.

(21) Appl. No.: 12/194,725

(22) Filed: Aug. 20, 2008

(65) Prior Publication Data

US 2009/0255321 A1    Oct. 15, 2009

Related U.S. Application Data

(60) Provisional application No. 61/044,995, filed on Apr. 15, 2008.

(51) Int. Cl.
*G01L 1/00*    (2006.01)
(52) U.S. Cl. .................................... 73/862.541
(58) Field of Classification Search ........................ None
See application file for complete search history.

(56) References Cited

U.S. PATENT DOCUMENTS

| | | |
|---|---|---|
| 5,718,366 A | 2/1998 | Colligan |
| 5,794,835 A | 8/1998 | Colligan et al. |
| 5,893,507 A | 4/1999 | Ding et al. |
| 5,922,998 A * | 7/1999 | Zefira ........................ 177/136 |
| 6,199,745 B1 | 3/2001 | Campbell et al. |
| 6,213,379 B1 | 4/2001 | Takeshita et al. |
| 6,230,958 B1 | 5/2001 | Coletta et al. |
| 6,237,835 B1 | 5/2001 | Litwinski et al. |
| 6,253,987 B1 | 7/2001 | Coletta et al. |
| 6,386,419 B2 | 5/2002 | Coletta et al. |
| 6,421,578 B1 | 7/2002 | Adams et al. |
| 6,537,682 B2 | 3/2003 | Colligan |
| 6,543,671 B2 | 4/2003 | Hatten et al. |
| 6,554,177 B2 | 4/2003 | Foster et al. |
| 6,638,641 B2 | 10/2003 | Delano |
| 6,669,075 B2 | 12/2003 | Colligan |
| 6,732,900 B2 | 5/2004 | Hansen et al. |
| 6,758,382 B1 | 7/2004 | Carter |
| 6,769,595 B2 | 8/2004 | Stol et al. |

(Continued)

OTHER PUBLICATIONS

Bhadeshia, H.K.D.H. "Friction Stir Welding." University of Cambridge. Printout from http://www.msm.cam.ac.uk/phase-trans/2003/FSW/aaa.html (May 22, 2007).

(Continued)

*Primary Examiner* — Robert Raevis
(74) *Attorney, Agent, or Firm* — Hovey Williams LLP

(57) ABSTRACT

A calibration assembly for a friction stir welding machine having a rotatable pin tool with upper and lower shoulders. The calibration assembly includes: a force measuring component for placement between the upper and lower shoulders of the pin tool; an upper bearing for placement between the upper shoulder of the pin tool and the force measuring component for permitting relative rotation therebetween; and a lower bearing for placement between the lower shoulder of the pin tool and the force measuring component for permitting relative rotation therebetween. The upper and lower bearings permit the pin tool to be rotated relative to the force measuring component during a calibration procedure. This permits the force measuring component to measure the forces directly applied by the pin tool while the upper and lower shoulders are either stationary or rotated relative to the force measuring component.

19 Claims, 3 Drawing Sheets

U.S. PATENT DOCUMENTS

| | | | |
|---|---|---|---|
| 6,779,708 | B2 | 8/2004 | Slattery |
| 6,799,708 | B2 | 10/2004 | von Strombeck et al. |
| 6,908,690 | B2 | 6/2005 | Waldron et al. |
| 6,994,242 | B2 | 2/2006 | Fuller et al. |
| 7,021,519 | B2 | 4/2006 | Foster et al. |
| 7,083,076 | B2 | 8/2006 | Slattery |
| 7,150,389 | B1 | 12/2006 | Knipstrom et al. |
| 7,152,776 | B2 | 12/2006 | Nelson et al. |
| 7,210,610 | B2 | 5/2007 | Nelson et al. |
| 7,216,793 | B2 | 5/2007 | Stotler et al. |
| 7,537,150 | B2* | 5/2009 | Burton et al. ............ 228/2.1 |
| 2002/0069708 | A1* | 6/2002 | McKenna ............ 73/862.637 |
| 2003/0183673 | A1* | 10/2003 | Hansen et al. ............ 228/2.1 |
| 2006/0006209 | A1* | 1/2006 | Loitz et al. ............ 228/2.1 |
| 2006/0289604 | A1* | 12/2006 | Zettler et al. ............ 228/2.1 |
| 2007/0034671 | A1* | 2/2007 | Burton et al. ............ 228/2.1 |
| 2007/0295110 | A1* | 12/2007 | Hochhalter et al. ..... 73/862.332 |
| 2008/0285901 | A1* | 11/2008 | Koike et al. ............ 384/448 |
| 2009/0184201 | A1* | 7/2009 | Talwar et al. ............ 244/119 |

OTHER PUBLICATIONS

Burford, Dwight et al. "Advances in Friction Stir Welding for aerospace applications." Airframer. Issue 14, pp. 3-7. Nov. 2006.

Dawes, C.J. et al. "Friction stir process welds aluminum alloys." Welding Journal (USA). vol. 75, No. 3, pp. 41-45. Mar. 1996.

Dawes, C.J. "An introduction to friction stir welding and its development." Weld. Met. Fabr. vol. 63, No. 1, pp. 13-14, 16. Jan. 1995.

Greitmann, Martin Josef et al. "Friction Stir Welding—Innovative Technology for Jointing Aluminum Components." Otto-Graf-Journal. vol. 16, pp. 185-192. 2005.

Lienert, T.J. et al. "Friction Stir Welding Studies on Mild Steel." Welding Journal. Supplement, pp. 1-S-9-S. Jan. 2003.

Metzbower, Edward. "Friction Stir Welding." Naval Research Laboratory. Printout from http:www.asminternational.org/Content/NavigationMenu/Membership/FellowsForum/PastArticles/stirweldimg.htm (May 22, 2007).

Mishra, Rajiv S. et al. "Friction Stir Welding and Processing." pp. v-vi. ASM International. 2007.

Su, P. et al. "Material flow during friction stir spot welding." Science and Technology of Welding and Joining. vol. 11, No. 1, pp. 61-71. 2006.

Thomas, W. et al. "FSW Process Variants and Mechanical Properties." Pre-HW Meeting on FSW in Nagoya 2004, Nagoya University, Japan, Jul. 9, 2004.

Uzun, Huseyin et al. "Friction stir welding of dissimilar Al 6013T4 to X5CrNi18-10 stainless steel." Materials & Design. vol. 26, issue 1, pp. 41-46. Feb. 2005.

"Mechanism for Self-Reacted Friction Stir Welding." NASA Tech Briefs. Marshall Space Flight Center, Alabama (Oct. 1, 2004).

"Friction Stir Welding at TWI." Printout from website http://www.twi.co.uk/j32k/unprotected/band__1/fswintro.html (May 22, 2007).

"Plastics Joining." Printout from website http://www.twi.co/uk/j32k/protected/band__3/pjkfwplast.html (May 22, 2007).

* cited by examiner

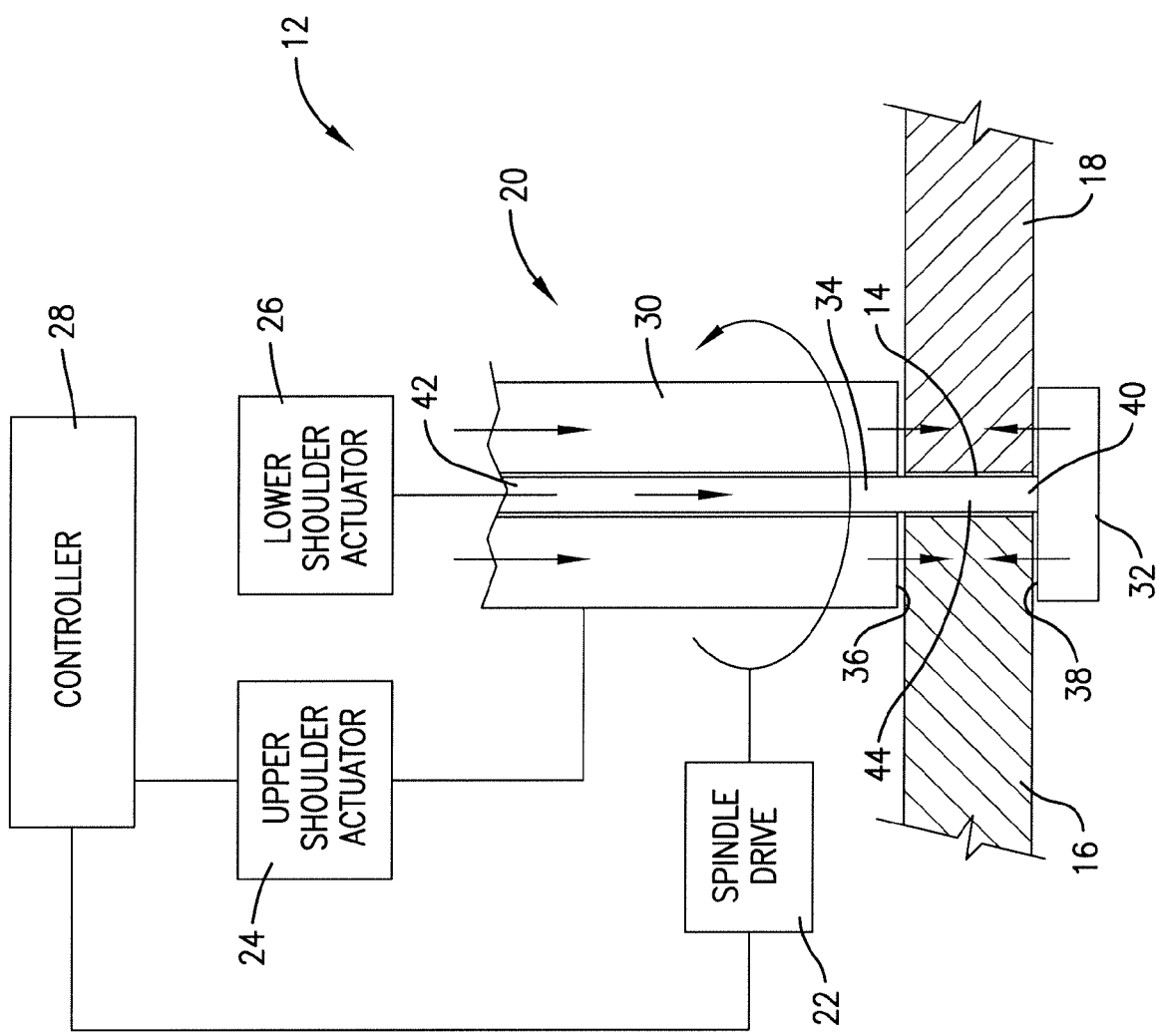

DYNAMIC CALIBRATION ASSEMBLY FOR A FRICTION STIR WELDING MACHINE

RELATED APPLICATIONS

This nonprovisional patent application claims priority benefit, with regard to all common subject matter, of earlier-filed U.S. provisional patent application titled "Dynamic Load Validation Device for Self Reacting and Conventional Friction Stir Welding", Ser. No. 61/044,995, filed Apr. 15, 2008. The identified earlier-filed application is hereby incorporated by reference in its entirety into the present application.

BACKGROUND OF THE INVENTION

The present invention relates to friction stir welding machines. More particularly, the invention relates to calibration techniques and devices for friction stir welding machines.

Friction stir welding is a process of welding two or more workpieces together and/or repairing cracks in a single workpiece using friction heat generated by a rotating pin tool. The pin tool is inserted into a joint between the workpieces (or sections of a single workpiece) and then rotated and moved along the joint to generate friction heat that forms a plasticized region along the joint.

A typical self-reacting friction stir welding pin tool includes an upper shoulder and a lower shoulder that together sandwich the workpiece or workpieces to be welded. The upper and lower shoulders can be moved toward or away from one another by actuators to accommodate workpieces of different thicknesses and to apply forging forces and pinch forces to the workpieces. The frictional heat generated by the pin tool is a function of the total forging forces of the upper and lower shoulders. Thus, it is important to accurately measure and control the applied forge forces to optimize various aspects of a welding operation.

Conventional friction stir welding machines typically measure forge forces indirectly with force transducers, pressure sensors, displacement sensors, or other devices that measure the amount of axial force applied by the actuators. Because of friction and other losses, the amount of force applied by the forge actuators doesn't always equal the actual force exerted on the workpieces. Moreover, such transducers, sensors, etc. often "drift" over time. It is therefore necessary to occasionally calibrate these transducers, sensors, etc.

Known calibration techniques use a sensor or sensors placed between a test workpiece and the upper and lower shoulders to measure the actual amount of force applied to the workpiece. These actual forces are then compared to the forces measured by the friction stir welding machine's internal transducers or sensors and any discrepancies are used for calibration. Unfortunately, these calibration techniques don't permit the upper and lower shoulders to be rotated during testing, resulting in force measurements that don't always equal the forces experienced during rotation of the shoulders due to friction in the head mechanism.

Accordingly, there is a need for improved friction stir welding calibration techniques that overcome the limitations of the prior art.

SUMMARY OF THE INVENTION

The present invention solves the above-described problems and provides a distinct advance in the art of friction stir welding calibration techniques. More particularly, the present invention provides a calibration assembly and method for measuring actual forge forces directly applied to a pin tool while the pin tool is being rotated.

One exemplary embodiment of the invention is a calibration assembly for a friction stir welding machine having a rotatable pin tool with upper and lower shoulders. The calibration assembly includes: a force measuring component for placement between the upper and lower shoulders of the pin tool; an upper bearing for placement between the upper shoulder of the pin tool and the force measuring component for permitting relative rotation therebetween; and a lower bearing for placement between the lower shoulder of the pin tool and the force measuring component for permitting relative rotation therebetween.

The upper and lower bearings permit the pin tool to be rotated relative to the force measuring component during a calibration procedure. This permits the force measuring component to measure the forces directly applied by the pin tool while the upper and lower shoulders are either stationary or rotated relative to the force measuring component. Moreover, because the force measuring component is sandwiched between upper and lower bearings, it can measure the forge forces while the upper and lower shoulders are rotated together or rotated independently (e.g., counter rotation, rotation at different speeds, or only one rotated).

The force measuring component may be any type of transducer that converts applied forces into measurable signals. For example, it may include a load cell held stationary relative to the upper and lower shoulders of the pin tool. In a particular embodiment, the force measuring component includes two spaced-apart beam load cells held stationary relative to the upper and lower shoulders of the pin tool and mounted so as to deflect when subjected to forge forces.

The calibration assembly may also include an upper spherical washer for placement between the upper bearing and the force measuring component and a lower spherical washer for placement between the lower bearing and the force measuring component for protecting the force measuring component from frictional forces caused by misalignment of the pin tool and sensor.

These and other important aspects of the present invention are described more fully in the detailed description below.

BRIEF DESCRIPTION OF THE DRAWING FIGURES

A preferred embodiment of the present invention is described in detail below with reference to the attached drawing figures, wherein:

FIG. 1 is a schematic diagram of selected components of a friction stir welding machine that may be calibrated with the techniques of the present invention.

Figure 3:
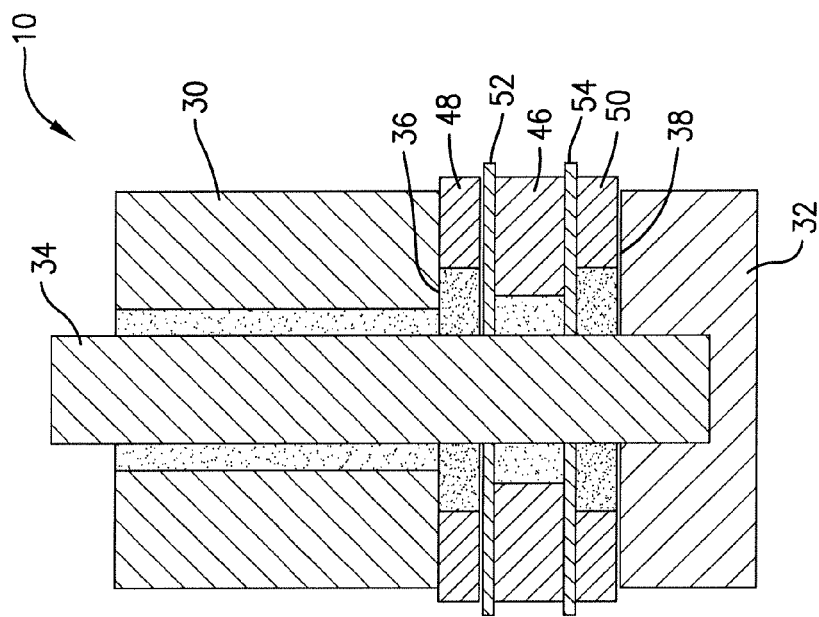
FIG. 3 is a vertical sectional view of the calibration assembly and friction stir welding machine shown in FIG. 2.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE PREFERRED EMBODIMENTS

Figure 2:
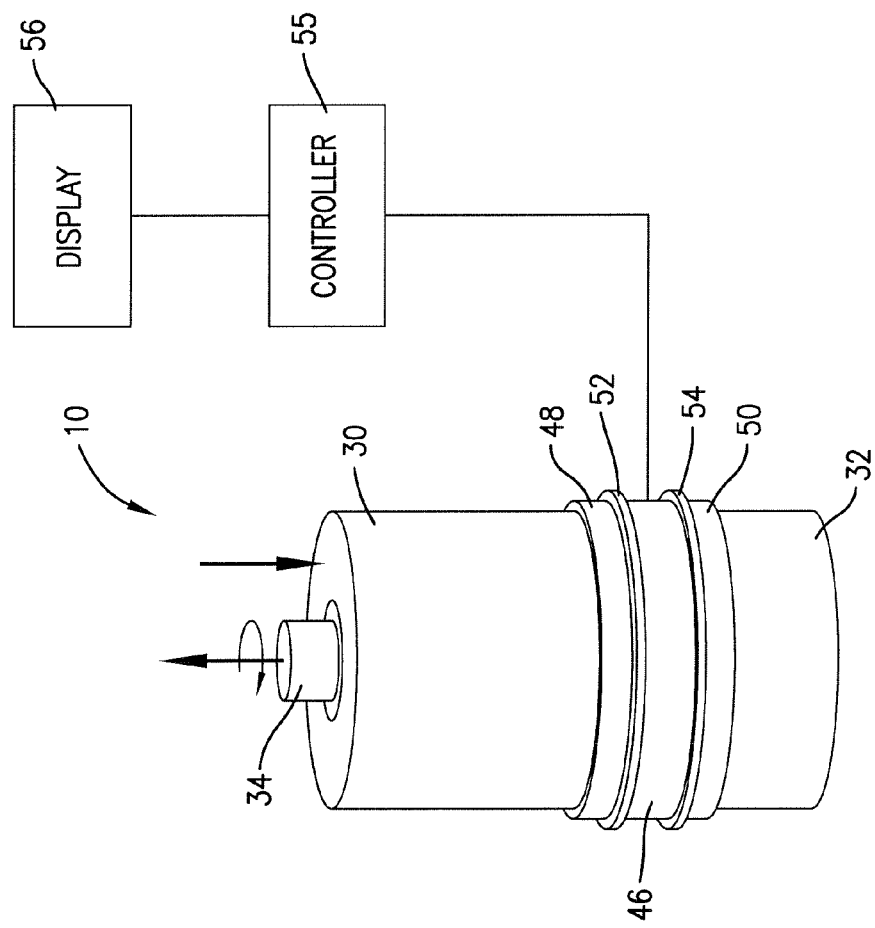
FIG. 2 is a schematic diagram of a calibration assembly constructed in accordance with an embodiment of the invention and shown in use with a friction stir welding machine.

Turning now to the drawing figures, and particularly FIGS. 2 and 3, a calibration assembly 10 constructed in accordance with an embodiment of the invention is illustrated. The calibration assembly 10 may be used to calibrate a friction stir welding machine 12 such as the one illustrated in FIG. 1. The exemplary friction stir welding machine 12 can be used to weld a joint 14 between two adjacent workpieces 16, 18 and may include, among other components, a rotatable pin tool 20 attached to or formed with a spindle, a spindle drive 22, an upper shoulder actuator 24, a lower shoulder actuator 26, and a controller or other control device 28. The friction stir welding machine 12 described and illustrated herein is merely an example of a friction stir welding machine that may be calibrated with the calibration assembly of the present invention. The calibration assembly 10 of the present invention may be used with other friction stir welding machines without departing from the scope of the appended claims.

The exemplary embodiment of the rotatable pin tool 20 includes an upper shoulder 30, a lower shoulder 32, and a pin 34 extending therebetween. The upper shoulder, lower shoulder, and pin are preferably formed of a material or materials having high strength and heat resistance such as tool steel or various metallic or nonmetallic alloys.

The upper shoulder 30 may be formed in a variety of shapes and sizes. In one embodiment, the upper shoulder is generally cylindrical and has a central longitudinal bore through which the pin 34 extends as described in more detail below. The upper shoulder has a lower face 36 for abutting the upper surface of the workpiece or workpieces 16, 18 to be welded as illustrated in FIG. 1.

The lower shoulder 32 may also be formed in a variety of shapes and sizes, and in one embodiment, is generally cylindrical. The lower shoulder 32 has an upper face 38 for abutting the lower surface of the workpiece or workpieces 16, 18 to be welded as illustrated in FIG. 1.

The pin 34 has first and second ends 40, 42 and an intermediate stirring portion 44 therebetween. The first end 40 is attached to or integrally formed with the lower shoulder 32 so that the lower shoulder and pin translate and rotate together. The second end 42 extends through the central bore of the upper shoulder 30 and is connected to the lower shoulder actuator 26. This slideably supports the lower shoulder and pin relative to the upper shoulder to accommodate various workpiece thicknesses. The stirring portion 44 extends between the two ends and is the portion of the pin that creates the weld joint in the workpieces.

The pin tool 20 is preferably attached to or integrally formed with a spindle (not shown) having independently rotatable and axially translatable inner and outer portions. The outer portion of the spindle may be attached or coupled to the upper shoulder 30 so as to rotate the upper shoulder. Similarly, the inner portion of the spindle may be attached to or coupled with the lower shoulder 32 or the pin 34 so as to rotate the lower shoulder or pin.

The upper shoulder actuator 24 is linked or otherwise coupled to the upper shoulder 30 to move the upper shoulder up or down relative to the lower shoulder 32. Likewise, the lower shoulder actuator 26 is linked or otherwise coupled to the lower shoulder 32 and pin 34 to move the lower shoulder and pin up or down relative to the upper shoulder. During welding, the upper and lower shoulder actuators move the upper and lower shoulders toward one another until they sandwich or pinch the workpieces 16, 18 between their upper and lower shoulders 36, 38 with a desired amount of forging forces.

The spindle drive 22 is linked or otherwise coupled to the spindle so as to rotate the upper and lower shoulders 30, 32 and the pin 34. The spindle drive and spindle may be configured to rotate only one of the upper or lower shoulders or may rotate both together or independently (e.g., different speeds and/or different directions).

The controller or other control device 28 is coupled with the tipper and lower shoulder actuators 24, 26 and the spindle drive to control the various rotational and translational movements of the pin tool. During a welding operation, the controller 28 causes the spindle drive to rotate the upper shoulder 30 and/or the lower shoulder 32 and causes the upper and lower shoulder actuators 24, 26 to apply forging forces on the upper and lower shoulders, respectively, while the pin tool is moved along the joint. Rotation of the pin and upper and lower shoulders generates friction heat to create a plasticized region along the joint for welding the workpieces together.

The friction stir welding machine 12 may also include various force transducers, pressure sensors, displacement sensors, or equivalent devices for measuring the amount of forging and pinching forces applied on the upper and lower shoulders 30, 32 by the upper and lower shoulder actuators 24, 26. As discussed in the Background section, these force transducers and/or sensors may require calibration from time to time.

The calibration assemblies of the present invention may be used to calibrate the above-described friction stir welding machine 12 and similar friction stir welding machines. The exemplary calibration assembly 10 shown in FIGS. 2 and 3 includes a force measuring component 46 for placement between the upper and lower shoulders 36, 38 of the pin tool 20; an upper bearing 48 for placement between the upper shoulder 36 of the pin tool and the force measuring component 46 for permitting relative rotation therebetween; a lower bearing 50 for placement between the lower shoulder 38 of the pin tool and the force measuring component 46 for permitting relative rotation therebetween; an upper spherical washer 52 for placement between the upper bearing 48 and the force measuring component 46; and a lower spherical washer 54 for placement between the lower bearing 50 and the force measuring component 46.

The force measuring component 46 measures the forging and pinch forces applied by the upper and lower shoulders 30, 32 during calibration. The force measuring component 46 may be any device capable of sensing an applied force and generating a corresponding signal. In the embodiment illustrated in FIGS. 2 and 3, the force measuring component is a strain-gauge compression load cell operable to measure an applied force on its upper and lower faces so as to measure forging forces delivered by both the upper and lower shoulders 36, 38 of the pin tool. The force measuring component may also consist of a hydraulic load cell, a pneumatic load cell, a piezo-resistive load cell, or any other transducer or similar device able to measure applied forces.

The upper and lower bearings 48, 50 permit the upper and lower shoulders 30, 32 to be rotated relative to the force measuring component 46 during a calibration procedure. This permits the force measuring component 46 to measure the force applied by the pin tool while the upper and lower shoulders 36, 38 are either stationary or rotated relative to the force measuring component. Moreover, because two independent bearings are provided on either side of the force measuring component, the force measuring component can measure applied forge forces while the upper and lower shoulders are rotated together or rotated independently. For example, the force measuring component 46 may measure the forge forces while only one of the upper or lower shoulders is rotated, while both are rotated at the same speed and in the same direction, or while both are rotated at different speeds and/or directions. The force measuring component may also simultaneously measure the forge forces applied by both the upper and lower shoulders or just the forge force applied by one of them.

The upper and lower bearings 48, 50 may be any type of rotary bearings or equivalent devices that permit relative rotation of the force measuring component 46 and the upper and lower shoulders 30, 32. In one embodiment, the bearings are thrust bearings designed to support a high axial load during rotation. The thrust bearings may be ball-type bearings, tapered roller bearings, fluid bearings, or equivalent devices.

The upper and lower spherical washers 52, 54 protect the force measuring component 46 from frictional forces caused by misalignment of the upper and lower shoulders 30, 32. The particular size of the spherical washers is selected to approximate the size of the force measuring component 46.

The calibration assembly 10 may also include a controller or other control device 55 that receives the force signals generated by the force measuring component 46 and converts the signals to force measurements. The control device 55 may include or be coupled with a display 56 or read-out device for displaying the force measurements.

Figure 4:
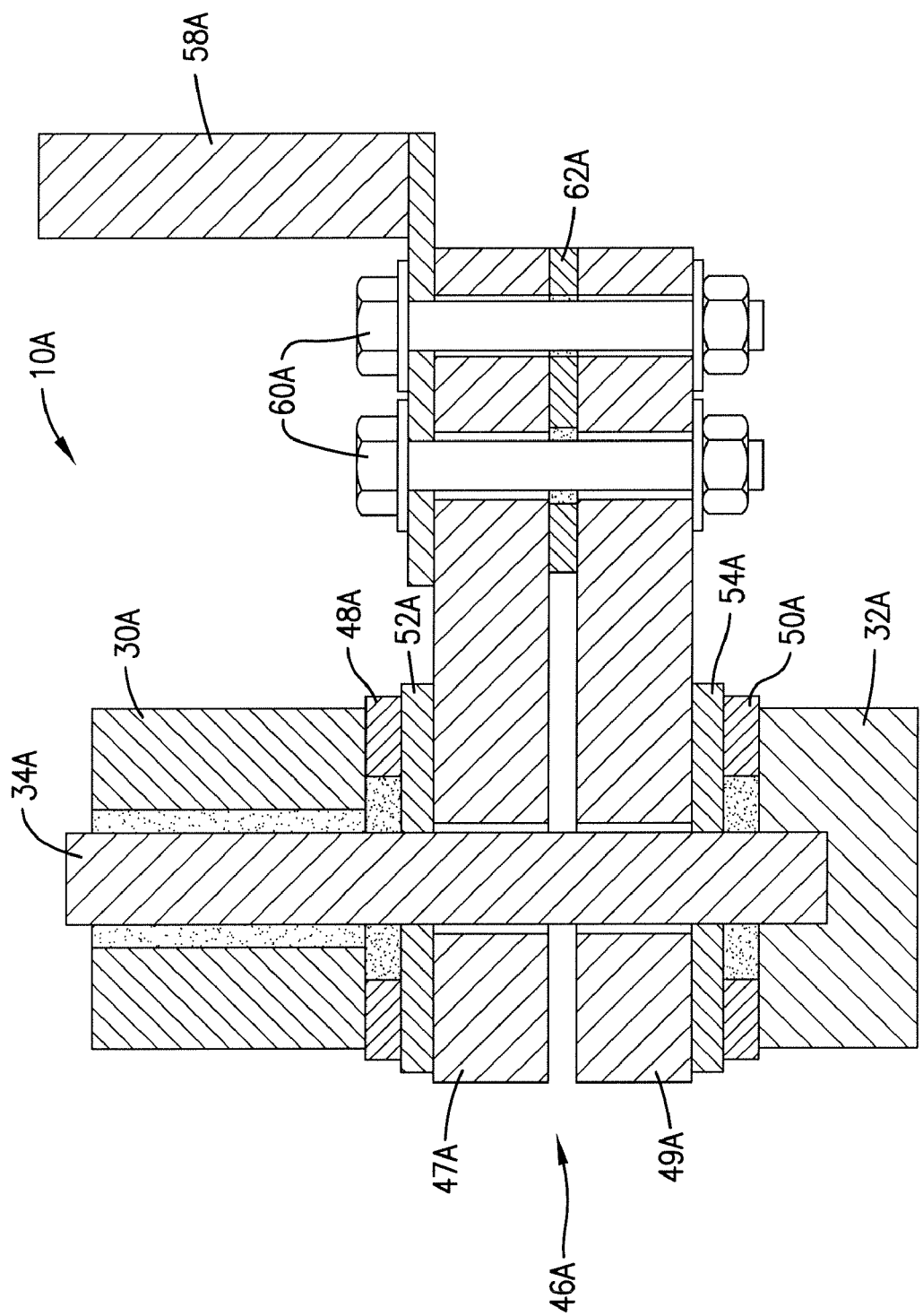
FIG. 4 is a vertical sectional view of a calibration assembly constructed in accordance with another embodiment of the invention and shown in use with a friction stir welding machine.

FIG. 4 illustrates a calibration assembly 10A constructed in accordance with another embodiment of the invention. The calibration assembly is substantially identical to the calibration assembly 10 of FIGS. 1 and 2 except for the force measuring component 46A. The force measuring component 46A consists of two beam-type load cells 47A, 49A such as the Rice Lake Weighing Systems RLETB Single-Ended Beam load cells. As shown, the beam load cells are fixed to an anti-rotation arm 58A by a pair of bolts or other fasteners 60A. The ends of the beams proximate the anti-rotation arm are separated by a spacer 62A. The ends of the beams sandwiched between the upper and lower shoulders 30A, 32A are spaced apart so that they may deflect when subjected to forging forces delivered by the upper and lower shoulders.

The above described calibration assemblies 10 and 10A may be used in a method for calibrating a friction stir welding machine. The force measuring component, upper and lower bearings, and upper and lower spherical washers are first placed between upper and lower shoulders of the pin tool of the friction stir welding machine as best illustrated in FIGS. 3 and 4. Forge forces are then applied to the pin tool by the upper and lower forge actuators to move the upper and lower shoulders toward one another and to sandwich the force measuring component and upper and lower bearings between the upper and lower shoulders. Either or both the upper and lower shoulders are then rotated relative to the force measuring component. At least one force is measured with the force measuring component while the upper shoulder or lower shoulder is rotated relative to the force measuring component. The measured force or forces are then compared to the force measurements sensed by the friction stir welding machine's internal force transducers or sensors and any discrepancies are used to calibrate the friction stir welding machine.

The control device 55 may also be connected to the controller 28 of the friction stir welding to enable a closed-loop calibration procedure. Specifically, whenever force measurements are acquired by the calibration assembly 10 or 10A, the control device 55 may deliver the measurements to the controller 28 so that the controller 28 can calibrate or otherwise adjust the upper and lower shoulder actuators and/or their related force transducers or sensors in accordance with the force measurements sensed by the calibration assembly. The functions of the control device 55 may even be performed by the friction stir welding machine controller 28, or vice versa, so that only one controller or other control device is required.

Although the invention has been described with reference to the preferred embodiment illustrated in the attached drawing figures, it is noted that equivalents may be employed and substitutions made herein without departing from the scope of the invention as recited in the claims.

The invention claimed is:

1. A calibration assembly for a friction stir welding machine having a rotatable pin tool with upper and lower shoulders, the calibration assembly comprising:
    a force measuring component for placement between the upper and lower shoulders of the pin tool, wherein the force measuring component measures a force applied by the pin tool while the upper and lower shoulders are either stationary relative to the force measuring component, rotated together relative to the force measuring component, or rotated independently relative to one another;
    an upper bearing for placement between the upper shoulder of the pin tool and the force measuring component for permitting relative rotation therebetween; and
    a lower bearing for placement between the lower shoulder of the pin tool and the force measuring component for permitting relative rotation therebetween.

2. The calibration assembly of claim 1, wherein the force measuring component is a load cell that is held stationary relative to the upper and lower shoulders of the pin tool.

3. The calibration assembly of claim 2, further comprising a control device for receiving electrical force signals from the load cell and for converting the electrical force signals into force measurements.

4. The calibration assembly of claim 3, further comprising a display coupled with the control device for displaying data representative of the force measurements.

5. The calibration assembly of claim 1, wherein the force measuring component includes two spaced-apart beam load cells held stationary relative to the upper and lower shoulders of the pin tool.

6. The calibration assembly of claim 1, further comprising an upper spherical washer for placement between the upper bearing and the force measuring component.

7. The calibration assembly of claim 1, further comprising a lower spherical washer for placement between the lower bearing and the force measuring component.

8. A calibration assembly for a friction stir welding machine having a rotatable pin tool with upper and lower shoulders, the calibration assembly comprising:
    a force measuring component placed between the upper and lower shoulders of the pin tool and held in a fixed position;
    an upper bearing placed between the upper shoulder of the pin tool and the force measuring component for permitting relative rotation therebetween;
    a lower bearing placed between the lower shoulder of the pin tool and the force measuring component for permitting relative rotation therebetween;
    a control device coupled with the force measuring component for calculating a force applied by the pin tool while the upper and lower shoulders are either stationary relative to the force measuring component, rotated together relative to the force measuring component, or rotated independently of one another.

9. The calibration assembly of claim 8, wherein the force measuring component is a load cell held stationary relative to the upper and lower shoulders of the pin tool.

10. The calibration assembly of claim 8, wherein the force measuring component includes two spaced-apart beam load cells held stationary relative to the upper and lower shoulders of the pin tool.

11. The calibration assembly of claim 8, further comprising a display coupled with the control device for displaying data representative of the force measurements.

12. The calibration assembly of claim 8, further comprising an upper spherical washer for placement between the upper bearing and the force measuring component.

13. The calibration assembly of claim 8, further comprising a lower spherical washer for placement between the lower bearing and the force measuring component.

14. A method for dynamically calibrating a friction stir welding machine, the method comprising:

placing a force measuring component between upper and lower shoulders of a pin tool of the friction stir welding machine;

placing an upper bearing between the upper shoulder of the pin tool and the force measuring component;

placing a lower bearing between the lower shoulder of the pin tool and the force measuring component;

applying forge forces to the pin tool to move the upper and lower shoulders toward one another so as to sandwich the force measuring component and upper and lower bearings between the upper and lower shoulders;

rotating at least one of the upper and lower shoulders relative to the force measuring component; and measuring at least one force with the force measuring component while the upper shoulder or lower shoulder is rotated relative to the force measuring component.

15. The method of claim 14, wherein the force measuring component is a load cell that is held stationary relative to the upper and lower shoulders of the pin tool.

16. The method of claim 14, further comprising the step of placing an upper spherical washer for placement between the upper bearing and the force measuring component.

17. The method of claim 14, further comprising the step of placing a lower spherical washer between the lower bearing and the force measuring component.

18. The method of claim 14, further comprising the step of comparing the force to a reference force measurement.

19. The method of claim 14, further comprising the step of displaying data representative of the force on a display.

\* \* \* \* \*